United States Patent
Focke et al.

[11] Patent Number: 6,106,040
[45] Date of Patent: Aug. 22, 2000

[54] PROCESS AND APPARATUS FOR HANDLING FLEXIBLE FILM PACKS

[75] Inventors: Heinz Focke; Andreas Prahm, both of Verden; Johann Klcso-Himstedt, Weyhe-Lahausen, all of Germany

[73] Assignee: Focke & Co. (GmbH & Co), Verden, Germany

[21] Appl. No.: 09/200,472

[22] Filed: Nov. 27, 1998

[30] Foreign Application Priority Data

Nov. 28, 1997 [DE] Germany .......................... 197 52 896

[51] Int. Cl.⁷ ................................ B66C 1/02; B25J 15/06
[52] U.S. Cl. ............................................. 294/64.1; 53/529
[58] Field of Search .................................. 294/2, 64.1, 65, 294/87.1; 901/40; 53/523, 527, 529, 247; 414/627, 737, 752

[56] References Cited

U.S. PATENT DOCUMENTS

| | | |
|---|---|---|
| 3,321,889 | 5/1967 | Zubik et al. . |
| 3,461,641 | 8/1969 | Zubik et al. . |
| 3,774,778 | 11/1973 | Faig . |

FOREIGN PATENT DOCUMENTS

| | | |
|---|---|---|
| 131866 | 1/1985 | European Pat. Off. . |
| 396210 | 9/1987 | European Pat. Off. . |
| 2523934 | 9/1982 | France . |
| 3624017 | 2/1988 | Germany . |
| 44 34 866 | 4/1996 | Germany . |
| 455 201 | 4/1968 | Switzerland . |

*Primary Examiner*—Dean J. Kramer
*Attorney, Agent, or Firm*—Sughrue, Mion, Zinn, Macpeak & Seas, PLLC

[57] ABSTRACT

Process and apparatus for handling flexible film packs (10), namely transporting them and introducing them into a folding box (12), having a lifting head (17) which grips a group of packs (13) on the top side by suction. The lifting head (17) is part of a lifting conveyer (16) and is connected, via a suction line (28), to a vacuum suction fan (31) which, with high delivery capacity, produces a slight suction action, such that the group of packs (13) is deformed in a wedge-shaped manner, that is to say such that it converges in the downward direction, and is thus introduced into the open folding box (12).

1 Claim, 5 Drawing Sheets

PROCESS AND APPARATUS FOR HANDLING FLEXIBLE FILM PACKS

BACKGROUND OF THE INVENTION

The invention relates to a process for handling, in particular for transporting, flexible film packs for cellulose products and similar deformable, soft products, the flexible film packs being gripped on the top side, and transported, by a suction head of a conveying apparatus and being introduced preferably into a container which is open at the top. The invention also relates to an apparatus for handling flexible packs of this type.

The packs which are to be handled are those which have soft, deformable contents and are enclosed on the outside by a thin film. The invention predominantly deals with the handling of flexible film packs for cellulose products, such as sanitary towels, nappies and paper handkerchieves. The aim is to introduce these flexible packs efficiently and reliably into a transporting container which is open at the top, namely a folding box. The intention is to ensure that for packaging reasons, but also to make optimum use of the folding box, the flexible packs are positioned in the box while being compressed slightly or having their volume reduced.

The predetermined volume of the flexible packs in the states in which they have been relieved of stress and pressure renders introduction into a smaller folding box problematic. Mechanical compression of the flexible packs is thus necessary, but involves additional outlay.

SUMMARY OF THE INVENTION

The object of the invention is to improve the handling of flexible film packs, in particular the introduction thereof into an open container or box, such that even the operation of introducing the flexible packs with reduced volume is possible without any mechanical outlay being required.

In order to achieve this object, the process according to the invention for handling the flexible packs is characterized in that flexible packs are gripped on the top side by the suction head and negative pressure is produced, with a large suction-air delivery quantity and comparatively low negative pressure, such that the flexible packs are deformed into a downwardly converging, conical cross-sectional form.

Surprisingly, the flexible packs acquire a trapezoidal configuration, which converges in the downward direction, or towards the side remote from the suction head, when negative pressure is applied to a (top) side surface by a suction head with suction action over its surface area. The downwardly converging configuration of the flexible packs is maintained, by continued suction, during transportation. The flexible packs are introduced into the folding box in this form. Once air has been admitted and the flexible packs have been released, the latter expand again and assume their original form, as far as this is possible within the folding box.

The effect of the deformation of the flexible packs is improved, or made possible, if the suction head grips a plurality of flexible packs, formed one beside the other as a group. In order to achieve the surprising deformation effect, first of all air is extracted from gap-like cavities between adjacent flexible packs. As a result, said packs are compressed in a region remote from the suction head and acquire the trapezoidal or a converging configuration.

It is also important that a sheet-like suction plate of the suction head is kept at a distance from the top side of the flexible packs by spacers or protrusions in the border region of the suction plate. Flexible-pack regions remote from the border are deformed against the suction plate at the beginning of the suction operation, this initiating, assisting and maintaining the abovedescribed, converging shape of the flexible packs.

The apparatus according to the invention is preferably a transporting robot, which has at least one suction head with a suction plate for gripping preferably a plurality of flexible packs. Formed around the periphery of the outer border of the suction plate is a supporting border, which rests on the top side of the flexible packs. According to the invention, dimensions of the suction head and/or of the suction plate are thus always somewhat smaller than the overall flexible-pack top side or surface which is to be attached by suction.

According to the invention, the suction head is connected to a vacuum suction fan which has a high delivery volume with comparatively low negative pressure.

Further details of the process and apparatus according to the invention are explained in more detail hereinbelow with reference to the drawings, in which:

DESCRIPTION OF PREFERRED EMBODIMENTS

Figure 1:
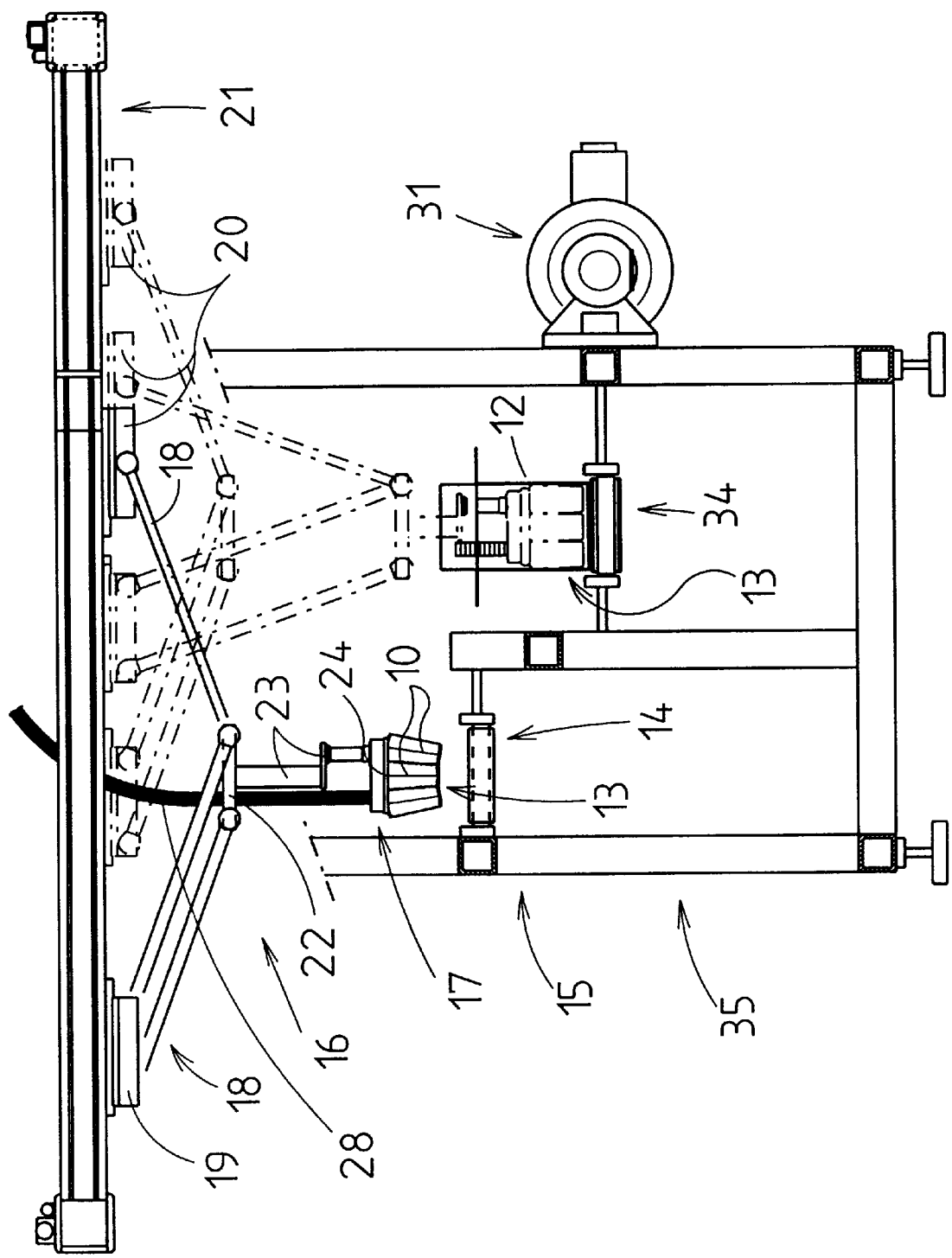
FIG. 1 shows a transverse view of an apparatus for introducing flexible packs into boxes.
Figure 2:
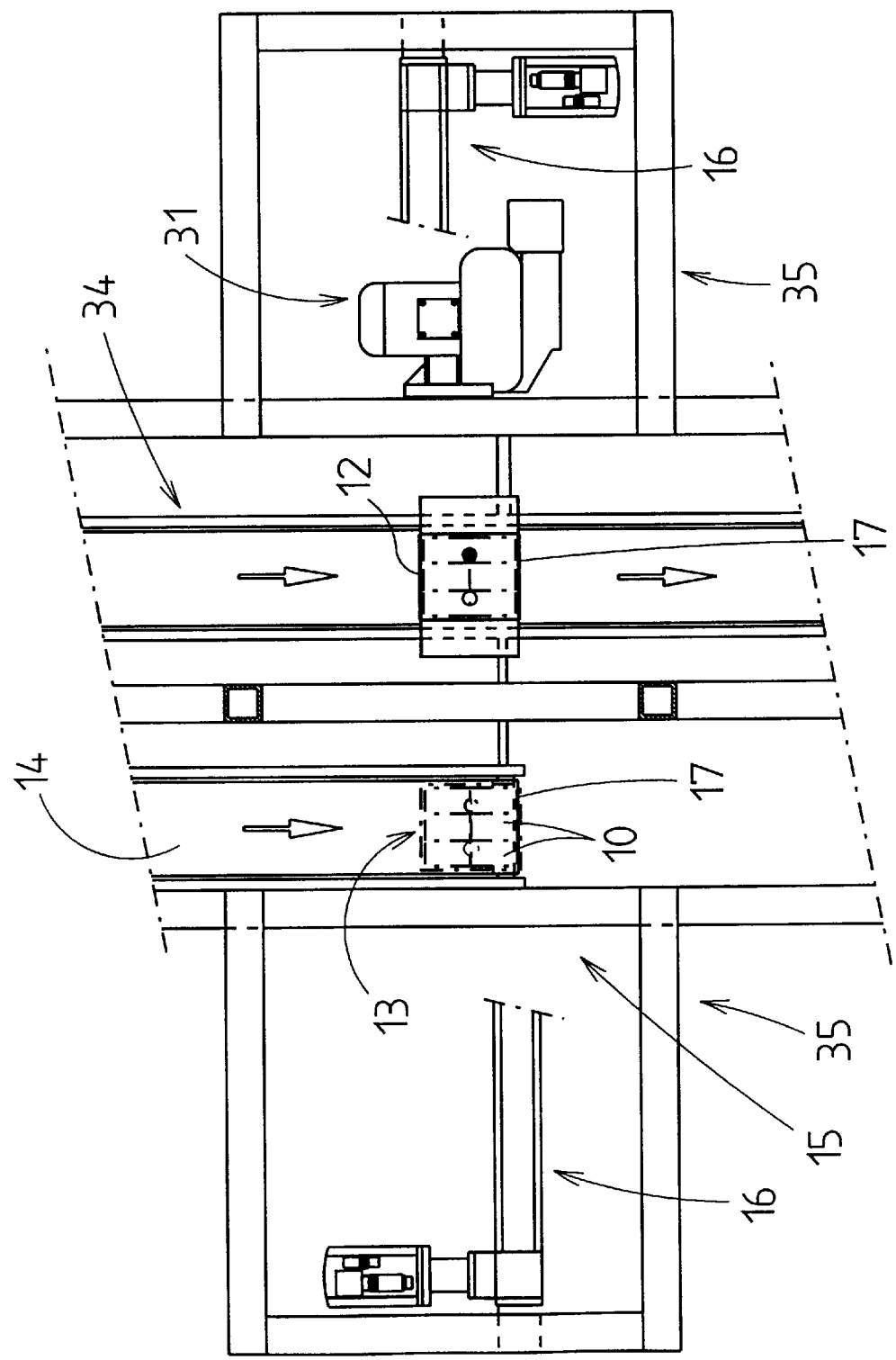
FIG. 2 shows a plan view of part of the apparatus according to FIG. 1.
Figure 3:
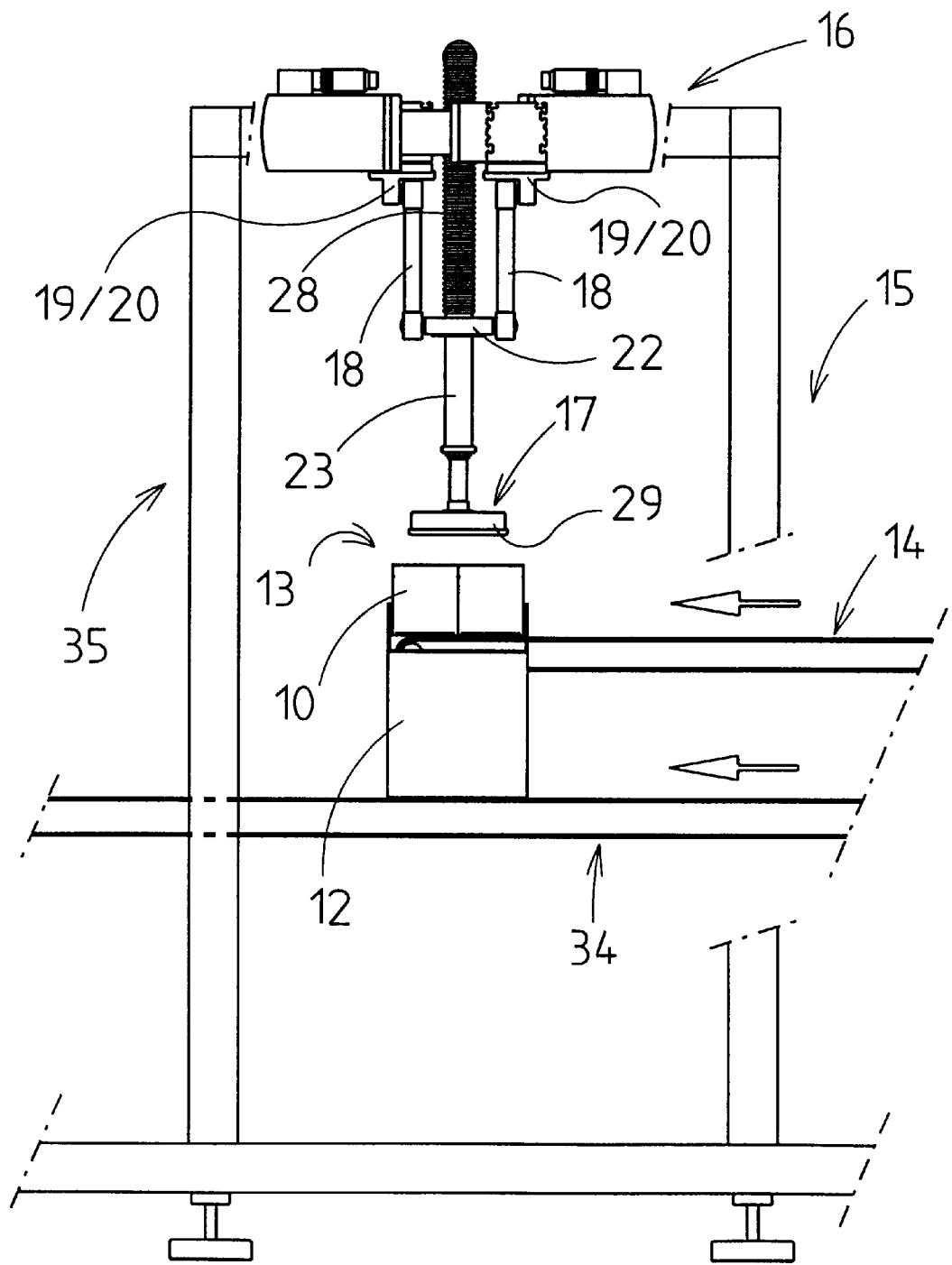
FIG. 3 shows a side view of the apparatus according to FIGS. 1 and 2.

The example illustrated in the drawings deals with the handling of packs 10, namely flexible film packs. The pack contents are soft, deformable and compressible, and in particular are cellulose products, such as sanitary towels, nappies and paper handkerchieves. These are enclosed all the way around by a thin film 11.

The intention is to introduce the packs 10 into a shipping container, in the present case into a folding box 12 which is open at the top. The packs 10 are fed, and introduced into the folding box 12, as a group of packs 13, it being possible for the folding box 12 to be filled completely by a plurality of groups of packs 13. In the example shown, the group of packs 13 comprises two rows each with three elongate packs 10 located one beside the other. These packs are dimensioned such that, within the box 12, they form one layer of packs 10, it being possible, according to FIG. 1, for two layers each comprising one group of packs 10 to be introduced into the folding box 12 one above the other.

The group of packs 13 is fed on a pack conveyer 14, namely a belt conveyer. In the region of a packaging station 15, the individual groups of packs 13 are gripped by a lifting conveyer 16, removed from the pack conveyer 14 and introduced into the folding box 12, which is open at the top, in a position offset in the transverse direction. The lifting conveyer 16 is designed such that a lifting head 17 can be moved in the vertical direction and in a plane extending transversely with respect to the pack conveyer 14. The lifting head 17 is fitted to a linkage 18 which can be moved back and forth, with carriages 19, 20, on horizontal conveyers 21. This lifting conveyer 16 corresponds, in terms of construction and functioning, to the design according to DE 196 30 376.1.

The lifting head 17 is fastened, via an upright mount 23, on a carrying crossmember 22, which is horizontal in each position. Said lifting head is designed as a suction head which grips and retains the packs 10 or the group of packs 13 by means of suction. For this purpose, the lifting head 17 has a suction plate 24 to which the packs 10 or the group of packs 13 can be attached by suction. Suction bores 25 make the suction plate 24 permeable to air over its entire surface area. An elastic, air-permeable covering 26, in particular made of foam rubber, is provided on the suction plate 24 on its free side, which faces the packs 10. The suction plate 24 is the bottom termination of a suction chamber 27. In the suction chamber 27, a negative pressure is produced by air being extracted via a suction line 28, which is connected to the suction chamber 27 and is designed as a flexible tube.

The planar abutment or suction surface of the lifting head 17 is bounded laterally by a protruding or projecting border 29. The latter is surrounded by an elastic supporting profile 30. When a group of packs 13 is received and/or retained, the border 29 or its supporting profile 30 butts against the top side of the group of packs 13. Accordingly, the top side or top surface of the article which is to be gripped—in this case the group of packs 13—is larger than the active surface of the lifting head 17 or of the suction plate 24. This ensures that the suction plate 24 butts against the top side of the group of packs 13 by way of its entire surface area. Moreover, the border 29 with the supporting profile 30 acts as a peripheral spacer or as a border ring supporting element on the top side of the group of packs 13.

Figure 4:
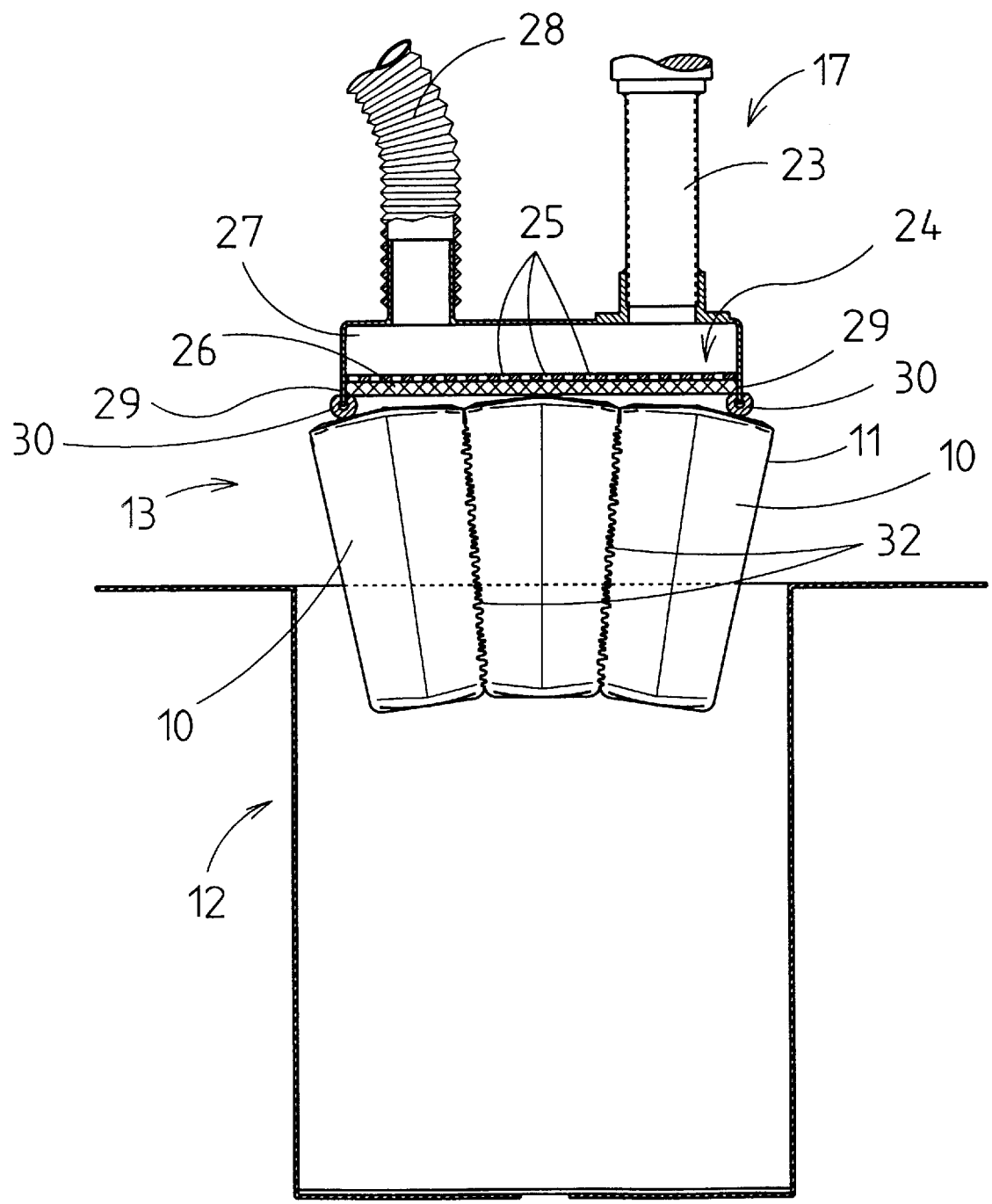
FIG. 4 shows, on an enlarged scale and partially in section, a detail of the apparatus, namely a lifting head during introduction of flexible packs into a box.
Figure 5:
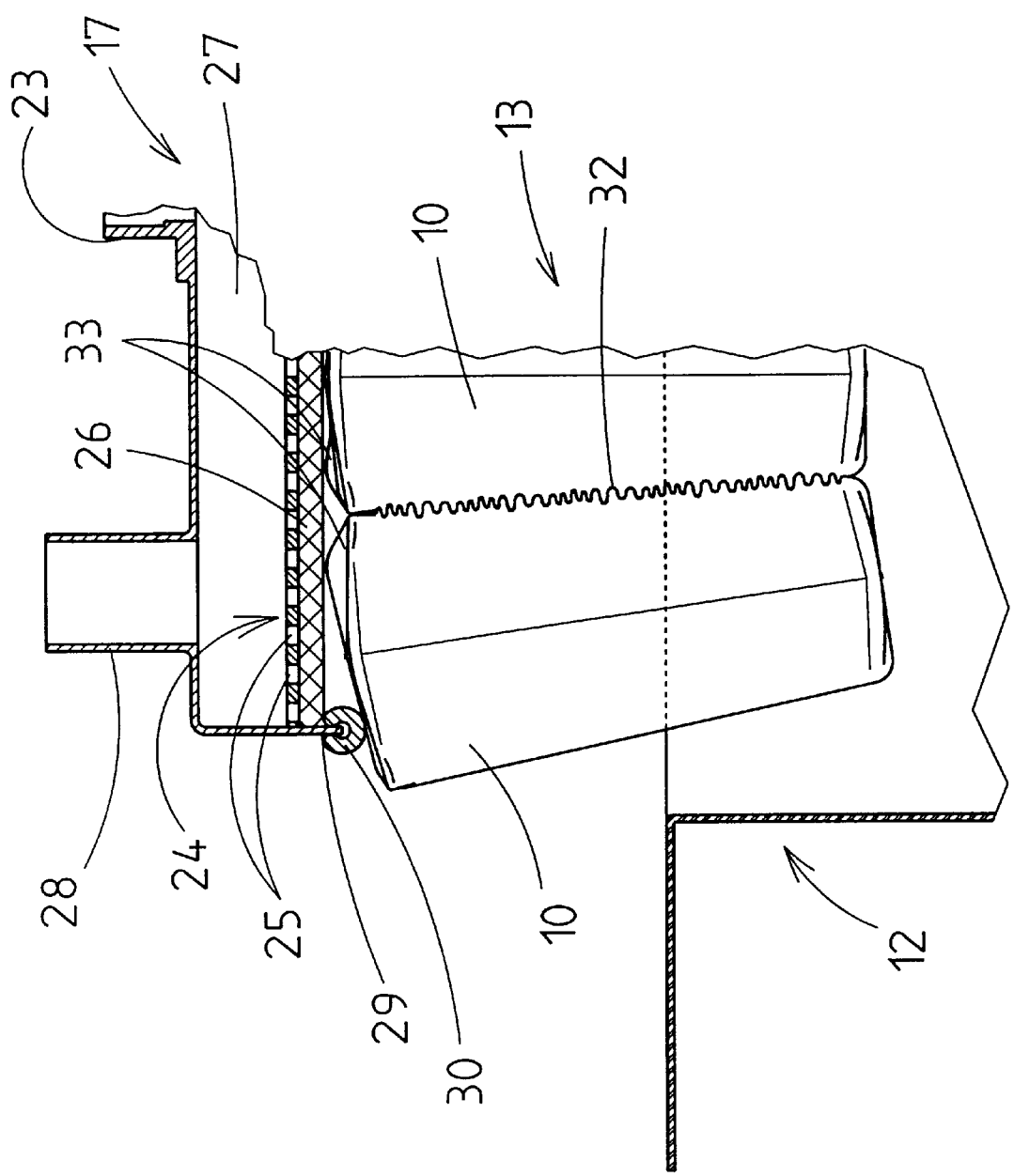
FIG. 5 shows a further-enlarged illustration of the lifting head according to FIG. 4.

A special, surprising effect resides in the fact that, when the packs 10 or the group of packs 13 are/is gripped exclusively on the top side by means of negative pressure, the group of packs 13 is deformed into a configuration which converges in the downward direction (FIGS. 4 and 5). The group of packs 13 acquires a wedge-shaped configuration. The dimensions in this case are selected such that the group of packs 13 deformed in the manner mentioned above have a bottom transverse dimension which is smaller than the corresponding dimension of the folding box 12, which is open at the top. It is thus possible for the wedge-shaped group of packs 13 to be introduced into the folding box 12, and set down in the same, without force or manual intervention.

The operation of the group of packs 13 being picked up by the lifting head 17 is based on special effects which result in the change in form of the group of packs 13. It is important that a comparatively low negative pressure with high air-extraction capacity is produced in the region of the lifting head 17, which is designed as a suction head. For this purpose, the lifting head 17 or the suction chamber 27 is connected, via the suction line 28, to a negative-pressure unit which has high delivery capacity with comparatively low negative pressure. A vacuum suction fan 31 is particularly suitable for this purpose. This fan has, for example, a capacity or delivery volume of 250 m$^3$/h. The negative pressure is advantageously 150 mbar.

Of further importance is the fact that the lifting head 17 is supported on the top side of the group of packs 13 by the border 29, which acts as a spacing element. As a result, when the packs 10 are attached to the suction plate by suction, the inner regions are bent, the top side being curved against the suction plate 24 in the process. This deformation results in the opposite happening in the bottom region of the group of packs 13, with the result that said group of packs is compressed, cross-sectional tapering taking place at the same time. This requires the contents of the packs 10 to be deformable.

It has also been established that, at the beginning of the suction operation, air is extracted from gaps formed between adjacent packs 10. As a result, abutting side walls 32 of the packs 10 are shortened, that is to say they are joined together in the manner of an accordion, undulations being formed in the process. This has the effect of the packs 10 acquiring a wedge-shaped configuration which converges in the downward direction. It can also be seen that curving of the top walls 33 occurs, that is to say upwardly directed, bubble-like deformations of the film 11 (FIG. 5).

Once the packs 10 have been set down in the folding box 12 and air has been admitted to the lifting head 17, the packs 10 resume the original, essentially cuboidal configuration and fill the relevant region of the folding box 12, expediently with a stressing action.

In the present exemplary embodiment, the folding boxes 12 are kept available on a box conveyer 34, which runs parallel to the pack conveyer 14. The box conveyer 34 feeds the empty folding boxes 12, which are open at the top, to the packaging station 15. The sealed folding boxes 12 are transported away in the same conveying direction. The pack conveyer 14 and box conveyer 34 run in offset planes. The box conveyer 34 is located in a plane beneath that of the pack conveyer 14. This ensures a short conveying path for the lifting head 17. The top side of the folding box 12 is located approximately level with the pack conveyer 14.

The pack conveyer 14 and box conveyer 34, on the one hand, and the lifting conveyer 16, on the other hand, are connected to one another by a common load-bearing framework 35 comprising longitudinally and transversely running load-bearing members and upright supports.

| List of designations | |
|---|---|
| 10 | Pack |
| 11 | Film |
| 12 | Folding box |
| 13 | Group of packs |
| 14 | Pack conveyer |
| 15 | Packaging station |
| 16 | Lifting conveyer |
| 17 | Lifting head |
| 18 | Linkage |
| 19 | Carriage |
| 20 | Carriage |
| 21 | Horizontal conveyer |
| 22 | Carrying crossmember |
| 23 | Mount |
| 24 | Suction plate |
| 25 | Suction bore |
| 26 | Covering |
| 27 | Suction chamber |
| 28 | Suction line |
| 29 | Border |
| 30 | Supporting profile |
| 31 | Vacuum suction fan |
| 32 | Side wall |
| 33 | Top wall |
| 34 | Box conveyer |
| 35 | Load-bearing framework |

What is claimed is:

1. A process for introducing into a packaging container a plurality of flexible soft packs of cellulose products which are surrounded by plastic film and which include sanitary napkins, diapers, and paper handkerchiefs, said process comprising:

positioning a plurality of the soft packs (10) adjacent to one another to form a group of the packs (13);

gripping the group of packs (13), only on an upper side of the group, by a lifting head (17) provided with suction air having a relatively low negative pressure and relatively high delivery capacity;

maintaining the group of packs (13) at a distance from a suction plate (24) of the lifting head (17) by means of spacers positioned around a perimeter of the lifting head (17);

deforming the group of packs (13), by the suction air and the spacers, thereby causing the group to assume a wedge-shaped cross-sectional form, which converges toward a free lower side of the group, and extracting air from gap-like interspaces between adjacent soft packs (10) of the group; and introducing the wedge-shaped group of packs (13), the lower side first, into an upper open end of a packaging container (12).

* * * * *